(12) United States Patent
Bordage et al.

(10) Patent No.: US 12,269,743 B2
(45) Date of Patent: Apr. 8, 2025

(54) LASER INDUCED GRAPHENE AS PRETREATMENT TO PLATE NON-CONDUCTIVE COMPOSITES

(71) Applicant: Goodrich Corporation, Charlotte, NC (US)

(72) Inventors: Kevin R. Bordage, Westfield, MA (US); Lara Naomi Huapaya Rojas, Marlborough, CT (US); Steven Poteet, Irvine, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 274 days.

(21) Appl. No.: 17/733,792

(22) Filed: Apr. 29, 2022

(65) Prior Publication Data

US 2022/0363545 A1 Nov. 17, 2022

Related U.S. Application Data

(60) Provisional application No. 63/188,769, filed on May 14, 2021.

(51) Int. Cl.
*C01B 32/184* (2017.01)
*B82Y 40/00* (2011.01)
*C01B 32/194* (2017.01)
*C08K 3/04* (2006.01)
*C25D 7/00* (2006.01)

(52) U.S. Cl.
CPC ............ *C01B 32/184* (2017.08); *B82Y 40/00* (2013.01); *C01B 32/194* (2017.08); *C08K 3/042* (2017.05); *C25D 7/00* (2013.01); *C01B 2204/32* (2013.01)

(58) Field of Classification Search
CPC ... C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225;

(Continued)

(56) References Cited

U.S. PATENT DOCUMENTS

| | | |
|---|---|---|
| 10,505,193 B2 | 12/2019 | Tour et al. |
| 2017/0166722 A1 | 6/2017 | Zhamu et al. |
| 2020/0002174 A1 | 1/2020 | Tour et al. |

FOREIGN PATENT DOCUMENTS

| | | | | |
|---|---|---|---|---|
| CN | 111383991 | * | 7/2020 | ........... H01L 21/768 |
| WO | 2020021361 | | 1/2020 | |
| WO | 2020197606 | | 10/2020 | |

OTHER PUBLICATIONS

Moravek, et al., Influence of CO2-laser mixture composition on the distribution of energy in nitrogen spectrum, Vacuum 2012; 86: 780-784 (Year: 2012).*

(Continued)

*Primary Examiner* — Daniel C. McCracken
(74) *Attorney, Agent, or Firm* — SNELL & WILMER L.L.P.

(57) ABSTRACT

A method of manufacture can comprise: treating a surface of a polymeric substrate with a laser induced graphene; and bonding a metallic layer to the laser induced graphene.

9 Claims, 5 Drawing Sheets

(58) Field of Classification Search
CPC ......... C01B 32/23; B82Y 40/00; C08K 3/042; C25D 7/00; C25D 5/02; C25D 5/34; C25D 5/54
See application file for complete search history.

(56) References Cited

OTHER PUBLICATIONS

Electroplating, accessed online at https://en.wikipedia.org/wiki/Electroplating on Jun. 29, 2024, pp. 1-10 (Year: 2024).*
Ross, Electrodeposited Multilayer Thin Films, Annu. Rev. Mater. Sci. 1994; 24: 159-188 (Year: 1994).*
Zaccagnini, et al., Laser-Induced Graphenization of PDMS as Flexible Electrode for Microsupercapacitors, Adv. Mater. Interfaces 2021; 8: 2101046, pp. 1 to 9 (Year: 2021).*
Cao, et al., Stable and durable laser-induced graphene patterns embedded in polymer substrates, Carbon 2020; 163: 85-94 (Year: 2020).*
European Patent Office, European Search Report dated Sep. 9, 2022 in Application No. 22173102.9.
Yin Jun et al: "Flexible 3D porous graphene film decorated with nickel nanoparticles for absorption-dominated electromagnetic interference shielding", Chemical Engineering Journal, Elsevier, Amsterdam, NL, vol. 421, Apr. 18, 2022, 9 pages.

* cited by examiner

LASER INDUCED GRAPHENE AS PRETREATMENT TO PLATE NON-CONDUCTIVE COMPOSITES

CROSS-REFERENCE TO RELATED APPLICATIONS

This application is a non-provisional of, and claims priority to, and the benefit of U.S. Provisional Application No. 63/188,769, entitled "LASER INDUCED GRAPHENE AS PRETREATMENT TO PLATE NON-CONDUCTIVE COMPOSITES," filed on May 14, 2021, which is hereby incorporated by reference in its entirety for all purposes.

FIELD

The present disclosure relates generally to systems methods for pretreatment to plate non-conductive components.

BACKGROUND

Polymer composites, including thermoset and thermoplastic composites, are used widely throughout the aerospace industry. A limiting factor to larger adoption is due to wear and abrasion of the surface. Metallic components can incorporate hard coatings that bond to the surface, many of which are plated. Polymer composites, however, are electrically insulative at the surface, preventing plating options unless metal strike layers are employed, significantly increasing costs due to additional processing.

In addition, some parts have to be electrically conductive (or have electrical bonding) for various reasons. For example, electrical bonding can be used to prevent static electricity build up in a part and ensure the part or assembly is adequately grounded (e.g., from a lightning strike, prevent arcing in a part from a fluid generating an electric charge while flowing through a part, etc.), a metallic plating can provide electromagnetic interference (EMI) shielding, or the like. For certain aerospace part designs, in order to have sufficient electrical conductivity, the part is manufactured from metal, or another conductive material. However, it can be desirable to utilize non-conductive materials, such as polyimides or the like, as non-conductive materials often weigh less, which is an important factor in the aerospace industry. However, producing sufficient electrical bonding on a non-conductive component can be difficult and costly.

SUMMARY

A method of manufacture is disclosed herein. The method can comprise: treating a surface of a polymeric substrate with a laser to photothermally convert the insulative polymer on the surface to a porous graphene; and bonding a metallic layer to the laser induced graphene. In various embodiments, the surface is an internal or external surface of an aerospace component, and wherein bonding the metallic layer is comprised of electroplating.

In various embodiments, the polymeric substrate has a non-conductive surface.

In various embodiments, treating the surface with a laser to photothermally convert the insulative polymer on the surface to a porous graphene further comprises laser scribing the surface with a carbon dioxide laser source.

In various embodiments, a first thickness of the metallic layer is at least 2 times a second thickness of the laser induced graphene.

A method of manufacturing an aerospace component is disclosed herein. The method can comprise: reflecting a laser beam from a laser source via a reflective component; laser scribing an internal surface of a polymeric component in response to reflecting the laser beam; forming a laser induced graphene on the internal surface in response to laser scribing the internal surface; and bonding a metallic layer to the laser induced graphene.

In various embodiments, bonding the metallic layer includes electroplating.

In various embodiments, wherein the laser beam includes a gas mixture comprising carbon dioxide. The gas mixture can further comprise helium and nitrogen. An average wavelength of the laser beam can be between 10 micrometers and 11 micrometers.

In various embodiments, bonding the metallic layer further comprises electrically coupling an anode having a metallic material to a positive terminal of a power source, coupling the laser induced graphene to a negative terminal of the power source, disposing the anode and the polymeric component in an electrolyte solution, and supplying a current via the power source. The metallic layer can comprise nickel, copper, chromium, gold, zinc, silver, platinum, palladium, rhodium, tin, cadmium, aluminum, cobalt, lead, tungsten, and alloys such as zinc-nickel, nickel phosphorous, and brass, for example.

An aerospace component is disclosed herein. The aerospace component can comprise: a polymeric material comprising an internal or external surface; and a metallic coating coupled to the surface.

In various embodiments, the aerospace component further comprises a laser induced graphene layer.

In various embodiments, the metallic coating comprises electroless nickel plating.

In various embodiments, the metallic coating can comprise one of nickel, copper, chromium, gold, zinc, silver, platinum, palladium, rhodium, tin, cadmium, aluminum, cobalt, lead, tungsten, and alloys such as zinc-nickel, nickel phosphorous, and brass, for example.

In various embodiments, the internal surface is an inner diameter surface of a shock strut or actuator piston The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In various embodiments, laser induced graphene (LIG), as disclosed herein, may comprise a low-cost, easy to implement method of incorporating graphene-like materials onto polymer composites by photothermally converting the polymer matrix at the surface to a conductive carbon. In this regard, an external laser etch could provide a facile and mechanically stable electrically conductive interface whereby traditional plating techniques could then be employed, in accordance with various embodiments. Non-line-of site areas would be accessible with the addition of specific part fixturing and reflective surfaces to reach hard to see sites, such as cylindrical inner diameter surfaces, or the like.

In various embodiments, the manufacturing processes and systems disclosed herein can facilitate the expansion of composite components in high wear locations. In various embodiments, the manufacturing processes and systems disclosed herein are a low-cost method configured to facilitate use of traditional plating methods with a large supply chain. In various embodiments, a resultant component made from the systems and methods disclosed herein can impart electromagnetic interface (EMI) shielding for a polymeric-based component. In various embodiments, a resultant component from the manufacturing processes and systems disclosed herein can result in improved thermal transport to an external surface.

Referring now to FIGS. 1 and 2A-2D, a method of manufacture 100 (FIG. 1) and an illustration of the method 100 (FIGS. 2A-2D) are illustrated, in accordance with various embodiments. In various embodiments, the method 100 comprises chemically etching a surface 212 of a polymeric substrate 210 to form an etched surface 214 (step 102). In various embodiments, chemical etching in accordance with step 102 may improve adhesion. However, the method of manufacture 100 can be performed without step 102 and still be within the scope of this disclosure. In various embodiments, the polymeric substrate 210 includes a thermoplastic resin. In various embodiments, the thermoplastic resin of the polymeric substrate 210 can be either crystalline or amorphous.

Examples of the crystalline thermoplastic resin include polyester, polyolefin, polyoxymethylene (POM), polyamide (PA), poly arylene sulfide, poly ketone (PK), poly ether ketone (PEK), polyether ether ketone (PEEK), polyether ketone ketone (PEKK), polyvinylidene fluoride (PVDF), polytetrafluoroethylene (PTFE), poly aryl ether ketone (PAEK), polyether nitrile (PEN), fluor resin, and liquid crystal polymer (LCP). Examples of the polyester include polyethylene terephthalate (PET), polybutylene terephthalate (PBT), poly trimethylene terephthalate (PTT), polyethylene naphthalate (PEN), and liquid crystal polyester. Examples of the polyolefin include polyethylene (PE), polypropylene (PP), and polybutylene. Examples of the poly arylene sulfide include polyphenylene sulfide (PPS). Examples of the fluoro resin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAI), polyetherimide (PEI), poly sulfone (PSU), polyether sulfone (PES), and poly arylate (PAR). The thermoplastic resin to be used for the polymeric substrate 210 also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

Figure 2A:
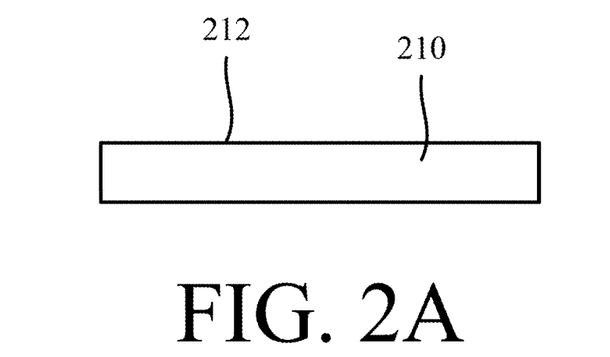
FIG. 2A illustrates a step in a method of manufacturing an aerospace component, in accordance with various embodiments.

In various embodiments, the polymeric substrate 210 is electrically insulating (e.g., non-conductive) at the surface. In this regard, the polymeric substrate 210 is limited from certain aerospace type applications due to not meeting wear or abrasion criteria, electrical bonding criteria, EMI shielding capabilities, or the like, in accordance with various embodiments. Additionally, other electrical plating methods, or processes, often result in poor or no adhesion of a metal to a polymeric substrate (e.g., polymeric substrate 210), which limits functionality of a plated polymeric substrate under higher loads associated with aerospace applications.

Figure 1:
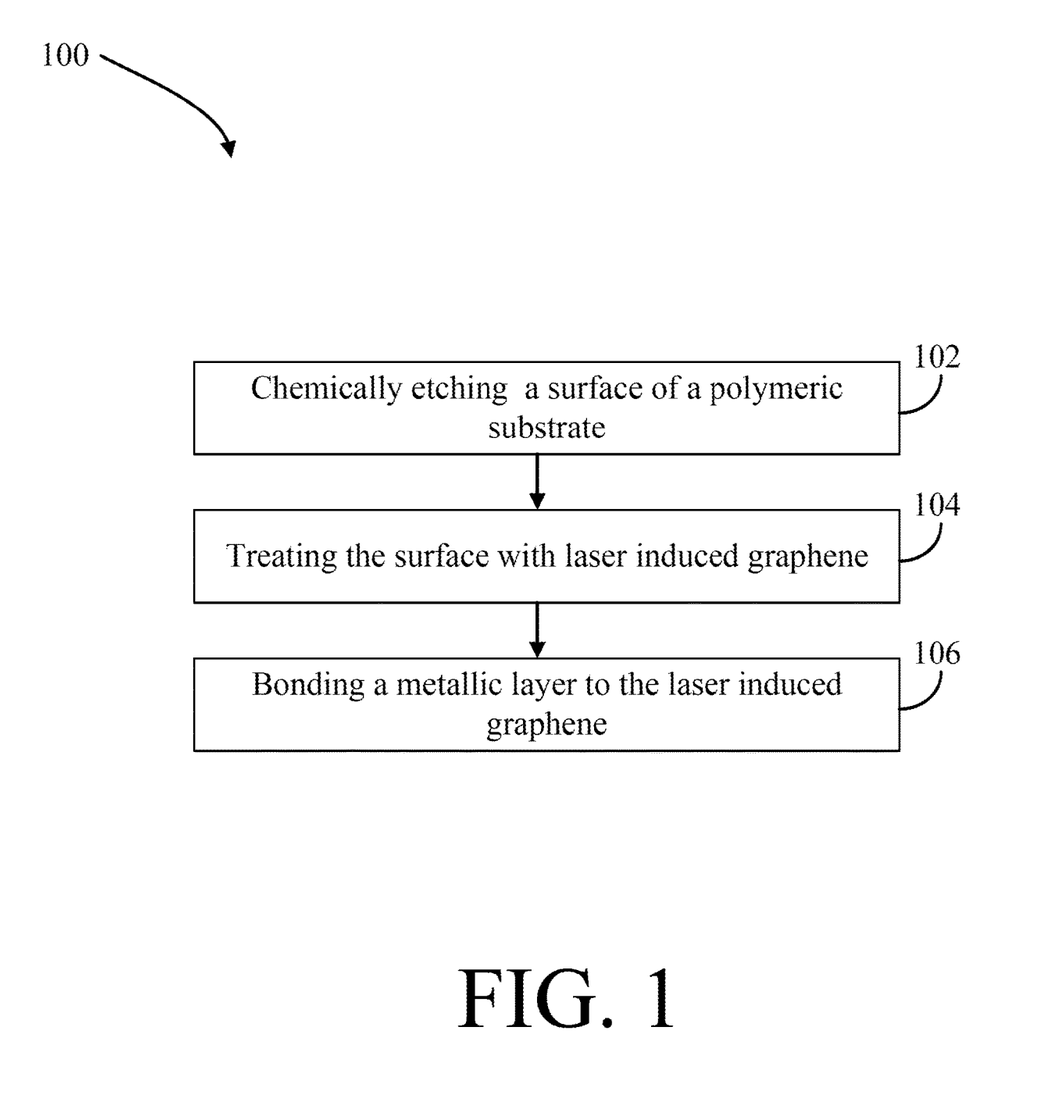
FIG. 1 illustrates a method of manufacturing an aerospace component, in accordance with various embodiments.
Figure 2B:
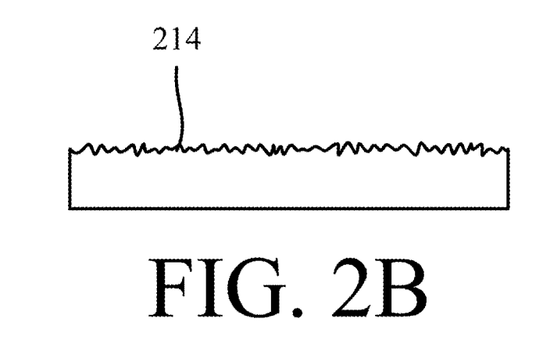
FIG. 2B illustrates a step in a method of manufacturing an aerospace component, in accordance with various embodiments.
Figure 2C:
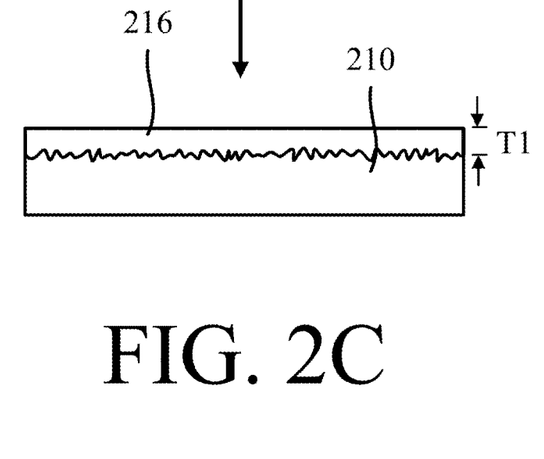
FIG. 2C illustrates a step in a method of manufacturing an aerospace component, in accordance with various embodiments.

In various embodiments, the method 100 further comprises treating the etched surface 214 of the polymeric substrate 210 with a laser to induce graphene formation at the surface 216 (step 104). If the method is performed without step 102, as described above, the surface 212 of the polymeric substrate 210 would be treated with the laser to induce graphene formation at at the surface 216 in step 104. In various embodiments, the laser induced graphene 216 is performed via laser scribing (i.e., irradiation with laser pulses that transform a portion of the polymeric substrate 210 into the laser induced graphene 216 via a photothermal pyrolysis process). As described further herein, a laser source can be an infrared (IR) laser source, an ultraviolet (UV) laser source, a carbon dioxide ($CO_2$) laser source, or the like. In various embodiments, the laser source is a $CO_2$ laser source. In this regard, a $CO_2$ laser source can provide relatively low cost, ease of use and maintenance, and/or greater efficiency relative to alternative laser sources for treating with laser induced graphene 216 in step 104, in accordance with various embodiments.

In various embodiments, the laser induced graphene 216 produced from step 104 comprises a first thickness T1. The first thickness can be between $1/10^{th}$ thousandths of an inch (2.54 μm) to $1/50^{th}$ thousandths of an inch (0.51 μm), or between $1/15^{th}$ thousandths of an inch (1.69 μm) and $1/35^{th}$ thousandths of an inch (0.73 μm), or approximately $1/25^{th}$ thousandths of an inch (1.02 μm). However, the present disclosure is not limited in this regard and various thicknesses outside the above range are within the scope of this disclosure. In various embodiments, the laser induced graphene 216 is a conductive surface. In this regard, the laser induced graphene 216 can help facilitate a greater bond with a metal plating being applied thereon in step 106 as described further herein.

Figure 5:
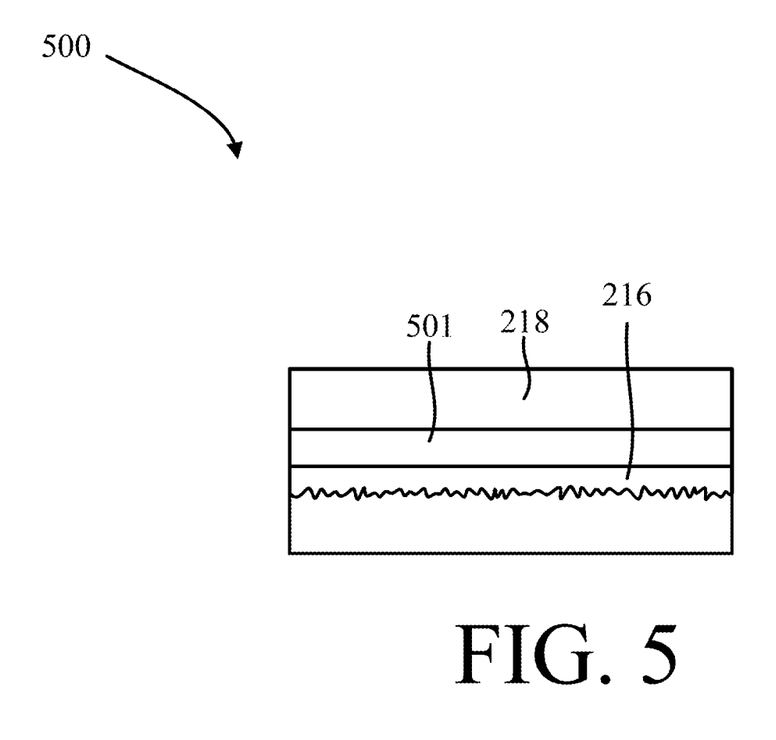
FIG. 5 illustrates a step in a method of manufacturing an aerospace component, in accordance with various embodiments.

In various embodiments, the method 100 further comprises bonding a metallic layer 218 to the laser induced graphene 216 (step 106). In various embodiments, a transition layer 217 can form between the laser induced graphene 216 and the metallic layer 218. The transition layer 217 can facilitate a stronger bond (e.g., a greater adhesion strength) between the laser induced graphene 216 of the polymeric substrate 210 and the metallic layer 218 relative to a bond created without the treating step 104. In various embodiments, there is no transition layer 217. The present disclosure is not limited in this regard. In various embodiments, due to the laser induced graphene 216 forming a conductive layer to bond with the metallic layer 218, a stronger adhesion strength is achieved relative to typical joining methods of polymeric materials to metallic layers. In various embodiments, the metallic layer can comprise any metallic layer. For example, the metallic layer 218 can comprise copper, nickel, chromium, gold, zinc, silver, platinum, palladium, rhodium, tin, cadmium, aluminum, cobalt, lead, tungsten, and alloys such as zinc-nickel, nickel phosphorous, and brass or the like. In various embodiments, the metallic layer 218 comprises nickel, or a nickel-based alloy as described further herein. In various embodiments, it may be beneficial to use more than one metallic layer 218 to create a gradient metal layer system. This may impart benefits to the structure, such as reducing strain mismatch between the metallic layer 218 and the laser induced graphene 216, or allowing the outer layer to be chosen based on function, such as hardness, conductivity, inertness, decorative means, etc. For example, with reference now to FIG. 5, a metal coated polymeric-based component 500 can comprise the laser induced graphene 216, the metallic layer 218, and a second metallic layer 501 disposed between the metallic layer 218 and the laser induced graphene 216. In various embodiments, a transition layer (e.g., similar to transition layer 217) can be formed between the laser induced graphene 216 and the second metallic layer 501 and between the metallic layer 218 and the second metallic layer 501.

Figure 2D:
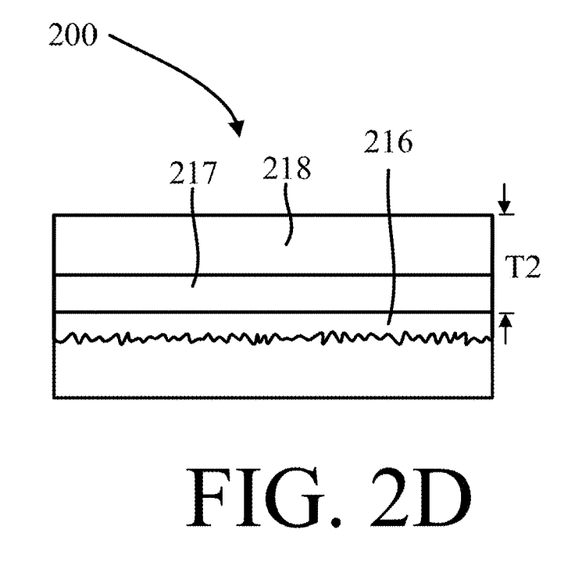
FIG. 2D illustrates a step in a method of manufacturing an aerospace component, in accordance with various embodiments.

In various embodiments, completion of step 106 of method 100 results in a metal coated polymeric-based component 200 is formed. In various embodiments, the metal coated polymeric-based component 200 comprises a coating thickness T2 that is between 2 and 1000 times greater than the thickness T1 of the laser induced graphene 216. In this regard, the coating thickness T2 can be significantly greater than the laser induced graphene 216. As described previously herein, the laser induced graphene 216 is provided to facilitate a significantly stronger bond between the polymeric substrate 210 and the metallic layer 218 and is provided to facilitate various joining techniques (as described further herein) that are typically only utilized for joining a metal to a metal. Thus, by treating the polymeric substrate 210 with laser induced graphene, the surface being coated with the metallic layer 218 is conductive (i.e., the laser induced graphene 216 is conductive), which enables less costly manufacturing methods to join the polymeric substrate to the metallic layer 218, in accordance with various embodiments.

Figure 3:
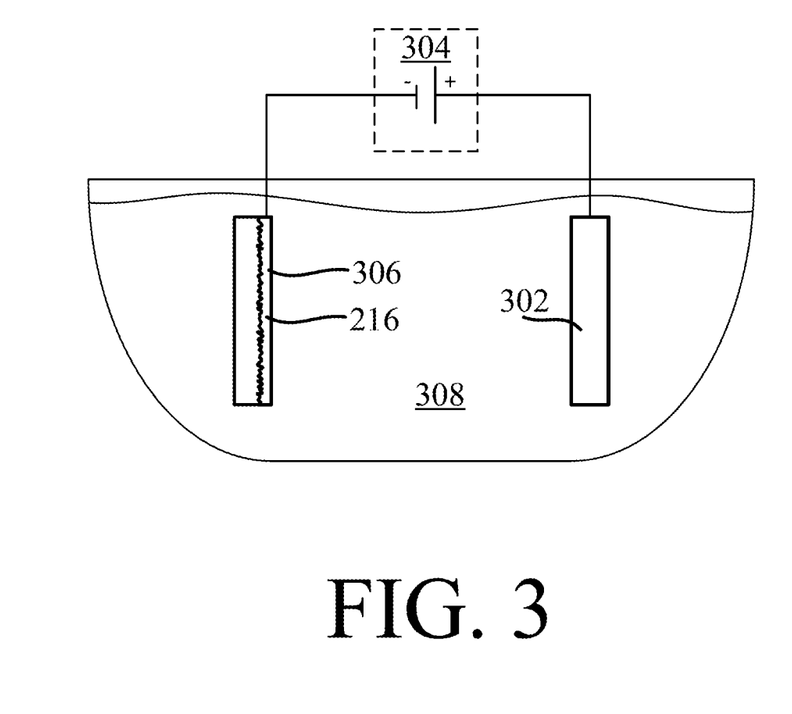
FIG. 3 illustrates a method of bonding a metallic layer to a laser induced graphene of a polymeric substrate, in accordance with various embodiments.

In various embodiments, the bonding step 106 can be performed via various methods. For example, step 106 can comprise electroplating, in accordance with various embodiments. With brief reference to FIG. 3, electroplating the metallic layer 218 to the polymeric substrate 210 can comprise: (a) coupling an anode 302 (e.g., made of a material that forms the metallic layer 218 in FIG. 2D) to a positive terminal of a power source 304, (b) coupling a cathode 306 (i.e., the laser induced graphene 216 created from step 104) to a negative terminal of the power source 304, (c) immersing the anode 302 and the cathode 306 in a solution 308 that contains an electrolyte (e.g., acids, bases, metal salts, molten salts, or the like), and supplying a current via the power source 304. In this regard, once direct current is applied, the anode 302 is oxidized, metal atoms of the anode dissolve in the electrolyte solution 308, the dissolved metal ions are reduced at the cathode 306 and from the metallic layer 218 from FIG. 2D. In various embodiments, the solution 308 comprises a watts bath composition (e.g., nickel sulfate, nickel chloride, and boric acid) (i.e., for brightening purposes), a nickel sulfamate bath composition (e.g., nickel sulfamate, nickel chloride, and boric acid), an all-chloride bath composition (e.g., nickel chloride and boric acid), a sulfate-chloride bath composition (e.g., nickel sulfate, nickel chloride, and boric acid), an all-sulfate bath composition (e.g., nickel sulfate and boric acid), a hard nickel bath composition (e.g., nickel sulfate, ammonium chloride, and boric acid), a black nickel bath composition (e.g., nickel ammonium sulfate, zinc sulfate, and sodium thiocyanate), or the like. The present disclosure is not limited in this regard.

Figure 4A:
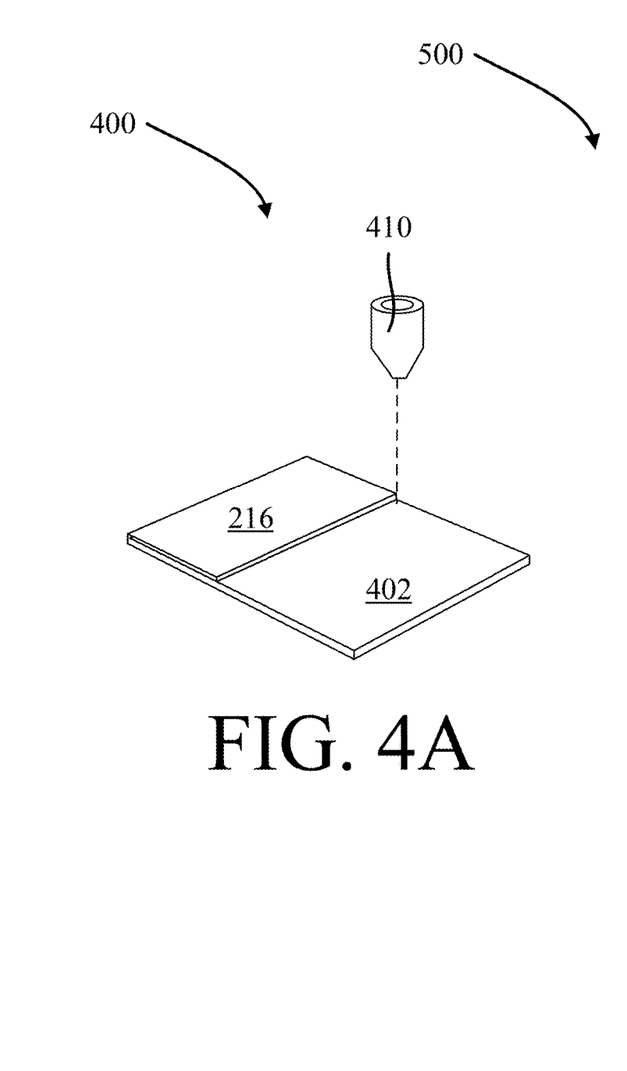
FIG. 4A illustrates a system for treating a surface with laser induced graphene, in accordance with various embodiments.

Referring now to FIG. 4A, a system 400 for treating an external surface 402 of a polymeric substrate 210 to form laser induced graphene 216 is illustrated, in accordance with various embodiments. In various embodiments, the external surface 402 comprises a direct line of sight. In this regard, a laser source 410 of the system 400 can be directly applied to the external surface 402. In various embodiments, the laser source 410 comprises an infrared (IR) laser source, an ultraviolet (UV) laser source, a carbon dioxide ($CO_2$) laser source, or the like. In various embodiments, the laser source 410 is a $CO_2$ laser source.

In various embodiments, an IR laser source as referred to herein, refers to a laser source configured to emit electromagnetic radiation having an average wavelength in a range between 700 nanometers (nm) and 1 millimeter). In various embodiments, UV laser source, as disclosed herein refers to a laser source configured to emit electromagnetic radiation having an average wavelength between 100 nm and 400 nm. In various embodiments, a $CO_2$ laser source as disclosed herein can be configured to emit a gas mixture comprising helium and carbon dioxide, and nitrogen. The gas mixture can be emitted at an average wavelength between 10 and 11 micrometers (μm). In various embodiments, the carbon dioxide is the laser-active medium, the nitrogen creates energy to facilitate excitation, and helium ensures dissipation of heat.

Figure 4B:
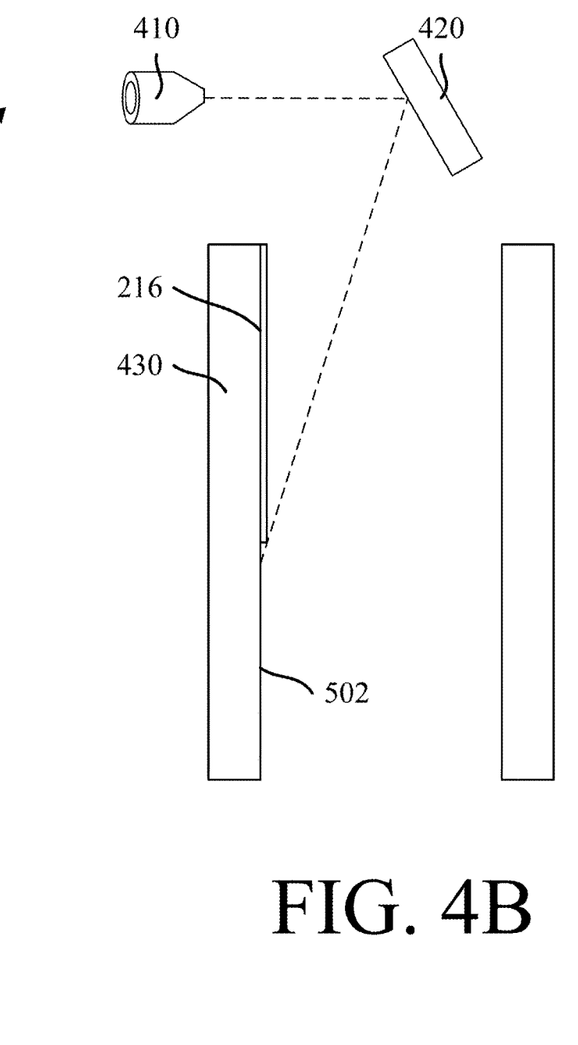
FIG. 4B illustrates a system for treating a surface with laser induced graphene, in accordance with various embodiments.

Referring now to FIG. 4B, a system 500 for treating an internal surface 502 (e.g., an inner diameter surface of a cylinder, a pipe, or the like) of a polymeric based component 420 (e.g., made of a polymeric substrate 210) is illustrated, in accordance with various embodiments. The system 500 includes the laser source 410 and a reflective component 420 (e.g., a mirror, a component with a highly reflective coating, or the like). Any reflective component 420 is within the scope of this disclosure. In various embodiments, any of the laser source 410, the reflective component 420 or the polymeric-based component receiving the laser treatment of step 104 can be configured to move relative to the other components. In this regard, the laser source 410 can move relative to the reflective component 420 and/or the polymeric based component 430, the reflective component 420 can be configured to move relative to the laser source 410 and/or the polymeric based component 430, the polymeric based component 430 can be configured to move relative to the laser source 410 and/or the reflective component 420, or any combination of the above.

In various embodiments, as described previously herein, the laser induced graphene treatment of step 104 facilitates a strong bond between a polymeric substrate 210 and a metallic layer 218. In various embodiments, the strong adhesion strength of the transition layer 217 from FIG. 2D facilitates use of the method 100 on aerospace grade polymeric materials that are electrically insulating. In this regard, a conductive coating can be applied to a polymeric substrate 210 via the method 100 from FIG. 1, and the component 200 from FIG. 2D can have weight saving benefits of being made mostly of a polymeric material, maintain electrical bonding criteria for the component, and/or be capable of enduring higher loads at a lower manufacturing cost relative to typical bonding methods of a polymeric substrate to a metallic layer, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method of manufacturing an aerospace component, the method comprising:
    reflecting a laser beam from a laser source via a reflective component;
    translating a first component relative to a second component, wherein the first component comprises at least one of the laser source, the reflective component, or a polymeric component, and the second component comprises another of the laser source, the reflective component, or the polymeric component;
    responsive to the translating, laser scribing an internal surface of the polymeric component in response to reflecting the laser beam, the polymeric component comprising a pipe, the internal surface comprising an inner diameter surface of the pipe;
    forming a laser induced graphene on the internal surface in response to laser scribing the internal surface, the laser induced graphene comprising a porous graphene; and
    bonding a metallic layer to the laser induced graphene.

2. The method of manufacture of claim 1, wherein bonding the metallic layer includes electroplating.

3. The method of manufacture of claim 1, wherein the laser beam includes a gas mixture comprising carbon dioxide.

4. The method of manufacture of claim 3, wherein the gas mixture further comprises helium and nitrogen.

5. The method of claim 3, wherein an average wavelength of the laser beam is between 10 micrometers and 11 micrometers.

6. The method of claim 1, wherein bonding the metallic layer further comprises electrically coupling an anode having a metallic material to a positive terminal of a power source, coupling the laser induced graphene to a negative terminal of the power source, disposing the anode and the polymeric component in an electrolyte solution, and supplying a current via the power source.

7. The method of claim 6, wherein the metallic layer comprises at least one of nickel, copper, chromium, gold, zinc, silver, platinum, palladium, rhodium, tin, cadmium, aluminum, cobalt, lead, tungsten, zinc-nickel, nickel phosphorus, and brass.

8. The method of claim 1, further comprising bonding a second metallic layer to the metallic layer.

9. The method of claim 8, wherein the metallic layer is a different material than the second metallic layer.

* * * * *